United States Patent [19]

Elberbaum

[11] Patent Number: 4,989,085
[45] Date of Patent: Jan. 29, 1991

[54] APPARATUS FOR REMOTE VERIFICATION AND CONTROL OF CLOSE CIRCUIT TELEVISION CAMERAS

[75] Inventor: David Elberbaum, Tokyo, Japan
[73] Assignee: Elbex Video, Ltd., Tokyo, Japan
[21] Appl. No.: 270,577
[22] Filed: Nov. 14, 1988
[30] Foreign Application Priority Data Feb. 29, 1988 [JP] Japan .................................. 63-44543

[51] Int. Cl.[5] .............................................. H04N 7/18
[52] U.S. Cl. ..................................... 358/108; 358/210
[58] Field of Search ................. 358/108, 181, 86, 183, 358/87, 210

[56] References Cited

U.S. PATENT DOCUMENTS

| | | | |
|---|---|---|---|
| 4,511,886 | 4/1985 | Rodriguez ...................... | 358/108 X |
| 4,673,974 | 6/1987 | Ito et al. ............................... | 358/108 |
| 4,777,526 | 10/1988 | Saitoh et al. ......................... | 358/108 |
| 4,831,438 | 5/1989 | Bellman, Jr. et al. ............... | 358/108 |

OTHER PUBLICATIONS

"Elbex" brochure; Two-Way Signal Transmission-Video and Audio from the Camera, Ext. Sync and Controls to the Camera through a Single Coax Cable (undated).

Primary Examiner—James J. Groody
Assistant Examiner—Victor R. Kostak
Attorney, Agent, or Firm—Helfgott & Karas

[57] ABSTRACT

A closed circuit television apparatus comprises a plurality of transmitters each including a remote-controlled television camera for generating video signals to a central supervisory station and a circuit for generating first code signals corresponding to a camera code allotted to the television camera, a receiver which receives the video signals and displays images corresponding to the received video signals. A controlling device is provided for controlling the television camera, receiving the first code signals, generating control signals to control the television camera and second code signals corresponding to the received first code signals, and transmitting the control signals and the second code signals to the television camera. A switching device is connected to the transmitters for selecting a transmitter to be connected to both, the receiver and the controlling device. Each transmitter includes a driving circuit for receiving the control signals and the second code signals generated in the controlling device, regenerating the control signals and the second code signals and operating the television camera based on the regenerated control signals when a code corresponding to the regenerated second code signals coincides with a code corresponding to the first code signals.

3 Claims, 2 Drawing Sheets

APPARATUS FOR REMOTE VERIFICATION AND CONTROL OF CLOSE CIRCUIT TELEVISION CAMERAS

BACKGROUND OF THE INVENTION

1. Field of the Invention:

This invention relates to a closed circuit television apparatus as a supervisory system, and more particularly to a closed circuit television apparatus in which operation of a television camera is remotely controlled.

2. Description of the Prior Art:

Generally, in a closed circuit television system such as a supervisory system, a remote-controllable television camera is located at each of a plurality of different places to be observed. At a central supervisory station, a monitor for receiving video signals from the selected television camera, a controlling device for controlling the operation and coordinates of the television camera, such as up-down (tilting), left-right (panning), far-near (focusing) and wide-tele (zooming), and a switching circuit for selecting one of the television cameras to be connected to the controlling device and the monitor, are located.

The positioning of each television camera coordinates such as tilting, panning, focusing and zooming are controlled by control signals supplied from the controlling device, and the television camera transmits video signals to the central supervisory station. The switching circuit includes a switch for the video signals and another switch for the control signals, and these two switches should be interlocked with each other.

A problem with such conventional closed circuit television apparatus is that if the two switches are not interlocked due to the break-down of the switching circuit, a wrong television camera coordinates could be repositioned.

Another conventional system uses two switches to be operated independently. In such conventional closed circuit system, the attendant must operate the switch to connect the monitor to the television camera that its coordinates must be repositioned and must connect the controlling device to the same television camera separately, which is laborious, time-consuming and may cause operational error as the attendant may connect a wrong camera to the controlling device.

SUMMARY OF THE INVENTION

It is therefore an object of the present invention to provide a closed circuit television apparatus in which only the television camera that its video signal is received will be remotely operated by the attendant without error.

According to the present invention, a closed circuit television apparatus comprises a plurality of transmitting means each including a remote-controllable television camera for generating video signals and a circuit for generating 1st code signals corresponding to a camera code allotted to the television camera, a receiving means for receiving the video signals and for displaying images corresponding to the received video signals, a controlling means for controlling the television camera, for receiving the 1st code signals, for generating 2nd code signals corresponding to the received 1st code signals, for generating control signal to control the television camera and for transmitting said 2nd code signals and said control signals to the television camera, and a switching means for selecting the transmitting means to be connected to the receiving means. The transmitting means further includes a driving circuit for receiving the control signals generated in the controlling means, for regenerating the control signals and the code signals and for operating the television camera coordinates based on the regenerated control signals when a code corresponding to the regenerated code signals coincides with a code allotted to the camera.

In the preferred embodiment of the present invention, said controlling means includes a circuit for generating said 2nd code signals and said control signals having a frequency corresponding to a kind of control, a circuit for generating carrier signals each having a frequency higher than the frequencies of said video signals, and a modulating circuit for modulating said carrier signals by said 2nd code signals and said control signals, and for outputting the modulated carrier signals to said switching means.

The driving circuit preferably includes a filter for extracting said carrier signals transmitted from said controlling means, a decoder for demodulating said 2nd code signals and said control signals from carrier signals obtained from the output of said filter and for outputting a code corresponding to said 2nd code signals and said control signals, a driver for actuating said television camera, and a controller for comparing said code, outputted from said decoder, with said camera code and for controlling said driver based on the control signals outputted from said decoder, when said code outputted from said decoder coincides with said camera code.

With this arrangement, the television camera is controlled based on the control signals transmitted from the controlling means only when the code transmitted from the controlling means coincides with a camera code allotted to the television camera to be controlled. Therefore, only the correct television camera be operated, other television camera not be operated.

Further, since the controlling means regenerates the 2nd code signals based on the 1st code signals transmitted from the transmitting means and transmits the 2nd code signals to the transmitting means. Therefore, the attendant cannot error and only the television camera which is connected to the receiving means is controlled.

BRIEF DESCRIPTION OF THE DRAWINGS

The foregoing and other objects and features of the invention will become apparent from the following description of a preferred embodiment of the invention with reference to the accompanying drawings, in which.

DETAILED DESCRIPTION OF THE PREFERRED EMBODIMENT

Figure 1:
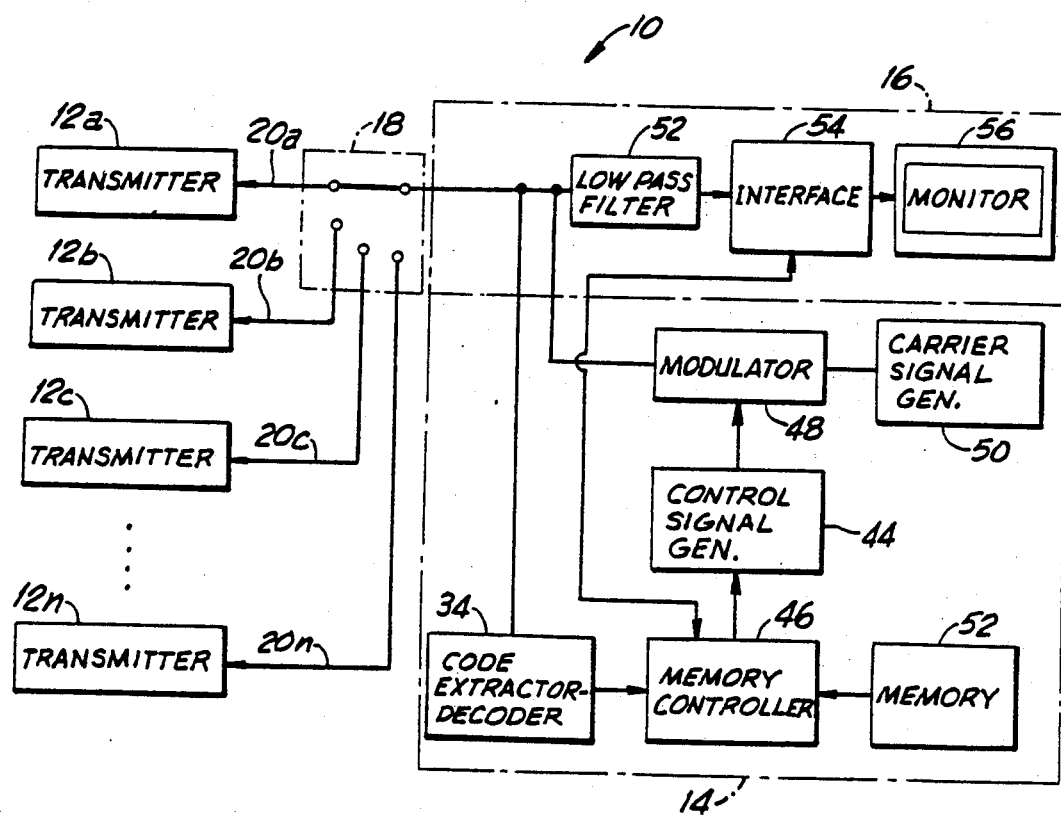
FIG. 1 is a block diagram showing an electrical circuit of an embodiment of a closed circuit television apparatus according to the present invention.

FIG. 1 shows a closed circuit television apparatus 10, in which a plurality of transmitting divices 12a, 12b, 12c ... and 12n for generating video signals and for transmitting the video signals to a central supervisory station are located at each of a plurality of different places to be observed.

On the other hand, at the central supervisory station, a controlling device 14 for controlling the functions of the individual transmitting device 12a, 12b, 12c . . . and 12n, a displaying device or receiving device 16 for receiving the video signals from the transmitting devices 12a, 12b, 12c . . . and 12n and displaying images corresponding to received video signals, and a switching device 18 for selecting one of the transmitting device 12a, 12b, 12c . . . and 12n to be connected to the controlling device 14 and the receiving device 16.

Between the central supervisory station and the respective places to be observed, cables or transmission lines 20a, 20b, 20c . . . and 20n for the respective transmitting devices 12a, 12b, 12c . . . and 12n are built.

Each video signal is a composite picture signal which is composed by adding a composite synchronizing signal, etc. to a picture signal.

Figure 2:
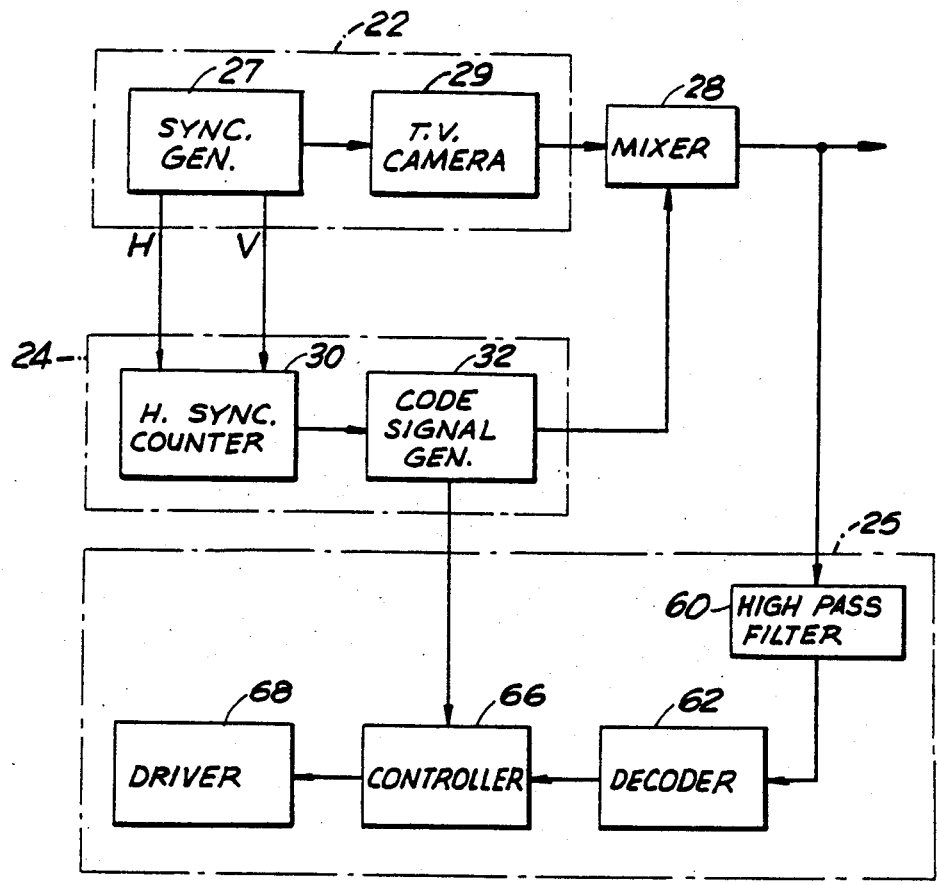
FIG. 2 is a block diagram showing an electrical circuit of an embodiment of a transmitting means.

As shown in FIG. 2, each of the transmitting devices 12a, 12b, 12c . . . and 12n includes a known television camera 22, a code signal generating circuit 24 for generating 1st code signals corresponding to the camera code allotted to the television camera 22, a driving circuit 26 for driving the coordinates of the television camera 22, such as up-down (tilting), left-right (panning), far-near (focusing) and tele-wide (zooming), and a mixer 28 for injecting the 1st code signals to the video signals. The coordinates of the television camera 22 and the camera operation are remote controllable.

The television camera 22 includes a synchronizing signal generating circuit 27 and a video signal generating circuit 29. The television cameras 22 of the transmitting devices 12a, 12b, 12c . . . and 12n, for example, are allotted with specific camera codes "1", "2" . . . and "n", respectively.

Horizontal and vertical synchronizing signals generated by the synchronizing signal generating circuit 27 of the television camera 22 are supplied to the video signal generating circuit 29 and also to a counter 30 of the code signal generating circuit 24.

The horizontal synchronizing signals are supplied to the input terminal of the counter 30, while the vertical synchronizing signals are supplied to a clear or reference terminal of the counter 30. Therefore, the counter 30 counts the number of horizontal scanning lines of the television camera 22 in reference to every field or frame of the vertical scanning. The counted value of the counter 30 is supplied to a code signal generator 32 of the code signal generating circuit 24.

The code signal generator 32 outputs 1st code signals, corresponding to the camera code allotted to the television camera 22, to the mixer 28 only when the counted value of the counter 30 is a predetermined value, for example, during specific horizontal scanning lines in vertical trace of the video signals. The camera code allotted to the respective television camera 22 is set in the code signal generator 32.

The code signal generator 32 may be a circuit which generates 1st code signals every single horizontal scanning and outputs the 1st code signals only when the counted value of the counter 30 is a predetermined value, or may be a circuit which is operative only when the counted value is a predetermined value.

The 1st code signal is a binary or bar code signal having two levels, high or white which is the maximum level of a picture signal in a video signal and low or black which is the minimum of a picture signal in the video signal supplied from the television camera 22 to the mixer 28. Alternatively, the 1st code signal may be a sine-wave signal having a frequency corresponding to the camera code.

The mixer 28 injects the 1st code signals from the code signal generating circuit 24 to the video signals from the television camera 22 and then outputs the composite signals of the code and video signals to a predetermined transmission line.

The controlling device 14 includes a decoder 34 for extracting the 1st code signals from the composite signals transmitted from any one of the transmitting device and for generating 2nd code signals corresponding to the extracted 1st code signals.

Figure 3:
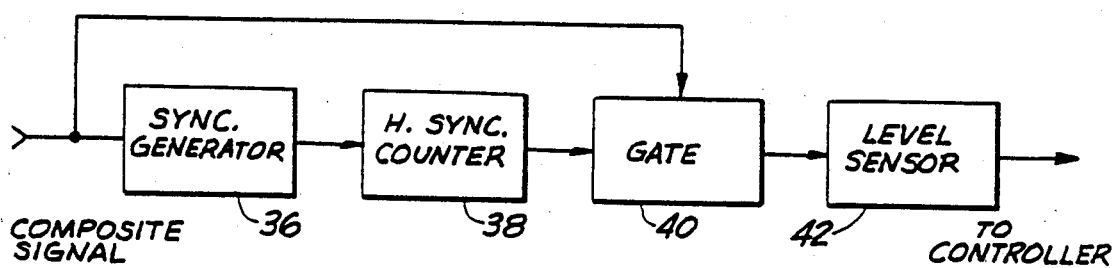
FIG. 3 is a block diagram showing an embodiment of a decoder for code signals.

The decoder 34, as shown in FIG. 3, includes a synchronizing signal separating circuit 36 for extracting horizontal and vertical synchronizing signals from the composite signals transmitted from the transmitting device, a counter 38 for counting the number of the separated horizontal sync pulses in reference to every field or frame of the separated vertical sync pulses, a gate circuit 40 allowing the composite signals, transmitted from the transmitting device to pass, only when the counted value of the counter 38 is a predetermined value, i.e., only during predetermined horizontal scanning lines, and a level sensor 42 for sensing the level of the output signals of the gate circuit 40 to generate 2nd code signals.

Hence, the gate allows the signals to pass during the same horizontal scanning lines in which the 1st code signals are generated by the transmitting device.

The output signals of the decoder 34 are supplied to a control signal generating circuit 44 via a controller 46. The control signal generating circuit 44 is activated by a push-button-type telephone apparatus or a tone encoder (on the market under the name such as "dual tone encoder", "touch tone encoder" and "dial tone").

The control signal generating circuit 44 includes a signal generator like the tone encoder, and a mixer for supplying to a modulating circuit 48 composite signals which are composed of the control signals generated by the control signal generator and 2nd code signals generated by the decoder 34.

Each control signal outputted from the signal generator is a composite signal of two signals different in frequency according to the kind of control and hence the control code. This composite signal is a combination of one of four different signals of frequencies f1, f2, f3, f4 and one of other four different signals of frequencies f5, f6, f7, f8, and is determined by depressing the control push buttons similar to a commonly known "dial tone" telephone apparatus.

The power-on command, the power-off command, the wiper-on command, and the wiper-off command are allotted, for example with the control codes "1", "2", "3"and "4", respectively. The control code may be one or more than one figure, and may be inputted by depressing the control push buttons to operate the tone encoder successively.

The signal generator for generating the control signals may be an alternative means operated by plurality of switches as substitute for the push buttons of the tone encoder. For this alternative form also, the control signal is a composite signal of two different signals according to the control code.

Further, the signal generator may include a control code setting circuit, and a processing circuit for generating control signals each having a frequency corresponding to the control code set by the setting circuit. This setting circuit may be operated by a key-pad, a plurality of switches, a joy stick, etc. Otherwise the setting circuit may be a remote-controller of radio or infrared system. The processing circuit may be a dial tone encoder or a computer serial coder.

The 2nd code signals may be a binary or bar code signal, or may be a sine-wave signal having a frequency different from the frequency of the control signal. The control signal may be a single signal or a combination of more than three signals having different frequencies according to the control code.

The modulating circuit 48 modulates the frequency of a carrier signal supplied from a carrier signal generating circuit 50, by the control and code signals from the control signal generating circuit 14. The modulated carrier signals are transmitted to a predetermined one of the transmitting device through the switching device 18 and via the transmission lines 20a 20b, 20c . . . and 20n, located between the switching device 18 and the transmitting device selected by the switching device 18, as a control information signal. Each carrier signal has a constant frequency higher than the maximum frequency of each video signal transmitted from the individual transmitting device 12a, 12b, 12c . . . and 12n to the receiving device 16.

Instead of modulating a single carrier signal by the 2nd code signal and the control signal, one of two carrier signals of different frequencies may have its frequency modulated by the 2nd code signals, and the other carrier signal may have its frequency modulated by the control signal.

The controlling device 14 includes a memory 52 in which information data indicating the location, the numeral, etc. of each television camera is memorized for every television camera. The information data in the memory 52 is read out by the controller 46.

The controller 46 includes a processor for the 2nd code signals supplied from the decoder 34. The controller 46 reads out from the memory 52 the information data concerning the television camera corresponding to the 2nd code signals transmitted from the decoder 34, and generates display signals to the monitor 58 to superimpose character and visual display on the reproduced image from the video signals transmitted from the transmitting devices 12a, 12b, 12c . . . and 12n to the receiving device 16.

The 2nd code signal is also supplied from the controller 46 to the control signal generating circuit 44 similar to the control signals. Other wise code information corresponding to the 2nd code signals for each television camera may be memorized in the memory 52, may be read out one of them from the memory 52 and outputted through the controller 46 to the control signal generating circuit 44 to be converted into a code of "dial tones" similar to the control signal.

The receiving device 16 includes a low-pass filter 54 which allows the video signals to pass and prevents the high frequency output signals of the controller device 14 from passing. The output signals of the filter 54 are supplied to a television receiver or monitor 58 via an interface 56 which superposes the display signals from the controller 46 on the output signals of the filter 54.

As a result, a visual character or illustrative display is superposed on the image reproduced from the video signals transmitted from one of the transmitting devices 12a, 12b, 12c . . . and 12n on the monitor 56 to identify the location being observed and the camera. Since the modulated carrier signals in the input signals to the receiving device 16 are eliminated by the filter 54, the picture or image reproduced on the monitor 56 cannot be affected by the control information signals even if the video signals and the control information signals are transmitted through a common transmission line.

The switching device 18 includes a switch having a plurality of fixed contracts connected independently to the transmission lines 20a, 20b, 20c . . . and 20n, and a movable contact adapted to be selectively connected to one of the fixed contacts, the movable contact being connected to the controlling device 14 and the receiving device 16. It may also be a known electronic sequential switcher commonly used in CCTV systems.

In order to process the control signals to be transmitted from the controlling device 14, the driving circuit 26 of each transmitting device 12a, 12b, 12c . . . and 12n includes a high-pass filter 60, as shown in FIG. 2. The filter 60 extracts the modulated carrier signals transmitted from the controlling device 14 and supplies the extracted signals to a demodulator/decoder 62.

The demodulator/decoder 62 demodulates the signals outputted from the filter 60 and converts the demodulated coded "dial tones" into a code corresponding to the 2nd code signals, and outputs this code to a controller 66.

Similarly, the demodulator/decoder 64 demodulates and decodes the control signals, and transmits the decoded control signals to the controller 66.

The controller 66 controls the operation of the television camera 22, such as make-and-break of a power, make-and-break of a wiper and changes the axis of: tilting (up-down), panning (left-right), focusing (far-near) and zooming (tele-wide), based on the output signals of the demodulator/decoder 62. This controller 66, however, will transfer the control signals from the output of the decoder 62 to the driver 68, only when the 2nd code signals transmitted from the decoder 62 are identical and coincide with the 1st code signals transmitted from the code signal generator 32.

The driver 68 incorporates known circuits for actuating the functions of the television camera 22, such as make-and-break of a power, make-and-break of a wiper, and rotates motors biderectionaly to change the axis of tilting position, panning position and the lens, focusing and zooming rings, as controlled by the controller 66.

According to the closed circuit television apparatus 10, when the movable contact of the switching device 18 is connected to the predetermined one of the fixed contact, the transmitting device 12a, for example, connected to the fixed contact is connected simultaneously to the controlling device 14 and the receiving device 16 requiring a single switch to connect the transmitting device 12a, for example, to both the receiving device 16 and the controlling device 14.

Another advantage of the closed circuit television apparatus 10 is that since the composite signals outputted from the transmitting device 12a are supplied to the controlling device 14, the controlling device 14 outputs to the receiving device 16 the display information concerning the television camera 22 of the transmitting device 12a by utilizing the 1st code signals in the composite signals and reading out the data stored in the memory 52, whereby characters or illustrated display corresponding to the location and the camera connected are superposed on the image or picture reproduced from the video signals, on the monitor 56 of the receiving device 16. Therefore, observing the picture displayed on the monitor 56 of the receiving device 16, the attendant at the central supervisory station can identify the location and the television camera of the transmitting device connected to the receiving device without error.

Furthermore, the operator can unmistakably operate the controlling device 14 that generates the control signals and the code signals to remotely operate the television camera that generates the image being observed by the operator while remotely controlling the same camera he is observing. Further, since the television camera is controlled by the driving circuit 26 of the transmitting device according to the transmitted control signals only when the code transmitted from the controlling device 14 coincides with the camera code, there is no danger that a wrong television camera could be affected by the control signals.

Partly because the control signals are transmitted to the transmitting device connected to the receiving device 16, and partly because the controlling device 14 generates the code information based on the code signal transmitted to the controlling device 14 the attendant at the central supervisory station can remotely control, through the controlling device 14, only the television camera of the transmitting device connected to the controlling device 14 and the receiving device 16, the picture or image of which is displayed on the monitor 56 of the receiving device 16.

What is claimed is:

1. A closed circuit television apparatus comprising:
   a plurality of remote-controlled television cameras for generating video signals, each camera including a circuit for generating 1st code signals allotted to a respective television camera;
   receiving means for receiving said video signals and said 1st code signals;
   switching means for selecting a television camera to be connected to said receiving means;
   said receiving means including a monitor for displaying images corresponding to the video signals received in said receiving means; and
   controlling means for controlling said television camera;
   said controlling means including control and code generator means for generating control signals to control said television camera and 2nd code signals corresponding to the 1st code signals received in said receiving means and for transmitting said control signals and said 2nd code signals to said television camera;
   each television camera further including a command circuit receiving said control signals and said 2nd code signals generated in said controlling means and operating said television camera in accordance with said control signals when said 2nd code signals coincide with a code allotted to said television camera.

2. A closed circuit television apparatus according to claim 1, wherein said control and code generator means includes a circuit for generating said 2nd code signals and a circuit for generating said control signals each having a frequency corresponding to a type of control, a circuit for generating carrier signals each having a frequency higher than frequencies of said video signals, and a modulating circuit for modulating said carrier signals by said 2nd code signals and said control signals, and for outputting the modulated carrier signals to said switching means.

3. A closed circuit television apparatus according to claim 2, wherein said command circuit includes a filter for extracting said carrier signals transmitted from said controlling means, a decoder for demodulating said 2nd code signals and said control signals from said carrier signals obtained from an output of said filter and for outputting a code corresponding to said 2nd code signals and said control signals, a driver for actuating said television camera, and a controller connected to said driver and said decoder for comparing said code outputted from said decoder with the code allotted to said camera and for controlling said driver in accordance with the control signals outputted from said decoder when said code outputted from said decoder coincides with said code of said camera.

* * * * *